(12) United States Patent
Kempf et al.

(10) Patent No.: US 12,464,099 B2
(45) Date of Patent: Nov. 4, 2025

(54) OPTICALLY REDUCED DISPLAY PIXEL FILL FACTOR FOR INCREASED DISPLAY RESOLUTION

(71) Applicant: TEXAS INSTRUMENTS INCORPORATED, Dallas, TX (US)

(72) Inventors: Jeffrey Matthew Kempf, Dallas, TX (US); Alexander Lyubarsky, Dallas, TX (US); Amit Mittal, Bangalore (IN); Terry Alan Bartlett, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 633 days.

(21) Appl. No.: 17/740,090

(22) Filed: May 9, 2022

(65) Prior Publication Data

US 2023/0362338 A1 Nov. 9, 2023

(51) Int. Cl.
*H04N 9/31* (2006.01)
*H04N 5/74* (2006.01)

(52) U.S. Cl.
CPC ........... *H04N 9/317* (2013.01); *H04N 5/7458* (2013.01); *H04N 9/3155* (2013.01)

(58) Field of Classification Search
CPC ...... H04N 9/315; H04N 9/317; H04N 9/3105; H04N 9/3108; H04N 9/3111; H04N 9/3152; H04N 9/3155; H04N 9/3158; H04N 9/3161; H04N 9/3188; H04N 9/3197; H04N 5/7458; G03B 21/005; G03B 21/008; G03B 21/28; G03B 21/208; G03B 21/2013; G03B 21/2033; G03B 21/2053
See application file for complete search history.

(56) References Cited

U.S. PATENT DOCUMENTS

| | | | |
|---|---|---|---|
| 2006/0044527 A1* | 3/2006 | Watanabe | H04N 9/3114 348/E5.142 |
| 2009/0009730 A1* | 1/2009 | Destain | G03B 21/28 353/121 |
| 2014/0002801 A1* | 1/2014 | Miura | F21V 5/008 353/38 |
| 2016/0286183 A1* | 9/2016 | Haraguchi | H04N 9/3111 |
| 2016/0347237 A1* | 12/2016 | Bhakta | F21S 41/255 |
| 2020/0081176 A1* | 3/2020 | Bartlett | G02B 6/0016 |
| 2021/0003854 A1* | 1/2021 | Bartlett | G03H 1/32 |

* cited by examiner

*Primary Examiner* — Sultan Chowdhury
(74) *Attorney, Agent, or Firm* — Michael T. Gabrik; Frank D. Cimino

(57) ABSTRACT

An apparatus includes a focusing lens, a SLM optically coupled to the focusing lens and comprising micromirrors on a surface of the SLM, where the focusing lens is tilted at an incident angle relative to the surface of the SLM, an incident light beam is illuminated on the SLM at the incident angle, and the incident angle is greater by an offset angle than twice a tilt angle of the micromirrors with respect to the surface of the SLM. The apparatus also includes an actuator optically coupled to the SLM, and projection optics optically coupled to the actuator.

18 Claims, 7 Drawing Sheets

OPTICALLY REDUCED DISPLAY PIXEL FILL FACTOR FOR INCREASED DISPLAY RESOLUTION

BACKGROUND

Projection-based displays project images onto surfaces, such as onto a wall or a screen, to present video or still pictures. Such displays can include cathode-ray tube (CRT) displays, liquid crystal displays (LCDs), and spatial light modulator (SLM) displays, etc.

SUMMARY

In accordance with at least one example of the disclosure, an apparatus includes a focusing lens; a SLM optically coupled to the focusing lens and comprising micromirrors on a surface of the SLM, where the focusing lens is tilted at an incident angle relative to the surface of the SLM, an incident light beam is illuminated on the SLM at the incident angle, and the incident angle is greater by an offset angle than twice a tilt angle of the micromirrors with respect to the surface of the SLM; an actuator optically coupled to the SLM; and projection optics optically coupled to the actuator.

In accordance with at least one example of the disclosure, a display device includes a laser configured to produce incident light; a SLM having a surface and comprising micromirrors on the surface, a focusing lens optically coupled to the laser and to the SLM and configured to direct the incident light towards the SLM; the micromirrors configured to reflect the incident light to produce modulated light, where an incident angle of the incident light at the micromirrors is greater by an offset angle than twice a tilt angle of the micromirrors with respect to the surface of the SLM; an actuator optically coupled to the SLM and configured to shift the modulated light from the SLM according to a tilt position of the actuator to produce shifted light; and a projection lens optically coupled to the actuator and configured to project the shifted light.

In accordance with at least one example of the disclosure, a method includes providing incident light by one or more light sources; directing the incident light by illumination optics towards micromirrors of an SLM at an incident angle relative to a surface of the SLM, where the incident angle is greater by an offset angle than twice a tilt angle of the micromirrors with respect to the surface of the SLM; modulating the incident light by the SLM by tilting the micromirrors to reflect the incident light into modulated light; shifting the modulated light by an actuator to provide shifted modulated light; and directing the shifted modulated light by projection optics to project a shifted image.

DETAILED DESCRIPTION

Figure 1:
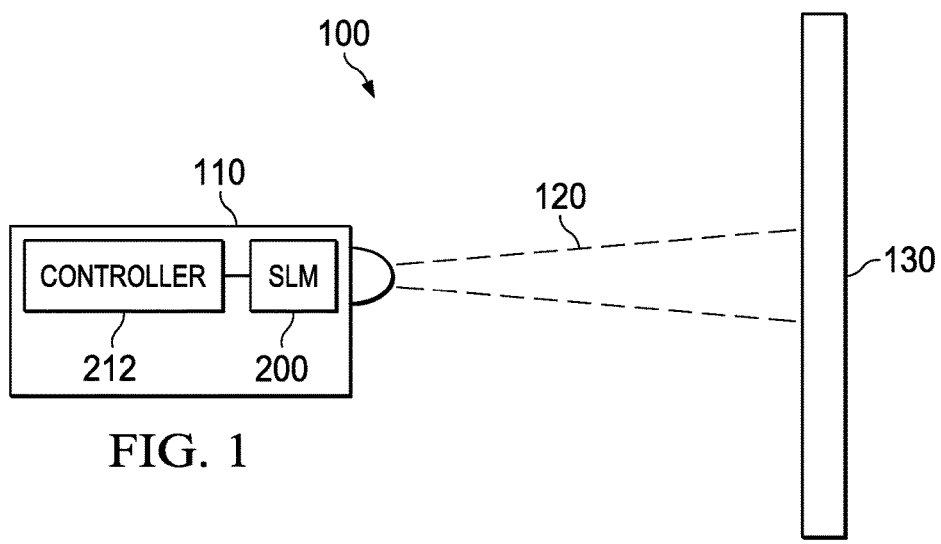
FIG. 1 is a diagram of a display system, in accordance with various examples.

An SLM display device includes optical elements which are usually arranged in a grid of rows and columns. Each optical element in the grid forms a pixel of the display. For example, the optical elements can be micromirrors in a digital mirror device (DMD) that are controlled to tilt at a certain rate to modulate the intensity of the light beam. A pixel provided by a micromirror with adjustable tilt is also referred to herein as a tilt-roll-pixel (TRP). The tilting of the micromirrors is controlled by applying certain voltages to the micromirrors, such as according to instructions from a processor of the SLM display device. The micromirrors are tilted to manipulate and reflect the light beam across pixels to project, onto a wall or a screen, shades of light that form an image.

In an SLM display device, a light beam from one or more light sources is modulated by adjustable micromirrors that form pixels to project an image. For example, an SLM display device can be a liquid crystal on silicon (LCoS) device, an LCD device, or a DMD. The pixel count of the SLM can be increased to increase the resolution of the SLM display device. To increase the pixel count in the SLM display device, either the pixel size and spacing are reduced or the total area of the grid of pixels in the SLM display device is increased. Both schemes can have challenges or disadvantages. Reducing the pixel size and spacing can be challenging due to limitations of manufacturing and optics. Increasing the area of the grid of pixels can reduce the die count per wafer, reduce yield, and/or increase package size, which increases manufacturing cost. The die count per wafer represents the number of display pixel grids that are manufactured on a wafer. Both schemes can also increase the complexity of the projection optics in the SLM display device. For example, reducing the pixel size may increase the resolving power of the optics, such as in collecting and projecting more light, and increasing the die size may increase the size of the optics.

To avoid reducing the pixel size or increasing the pixel grid size, the resolution of the SLM display device can be increased by a technique, referred to herein as shift-add fusion (SAF), which combines multiple projected instances of an image into an image with a higher resolution. According to SAF, an image is projected multiple times, such as on a wall or a screen, each time with a lateral shift in the projection of light from the grid of pixels in the SLM display device. Instances of the image can be projected successively in time by shifting light projection at a certain rate. Light projection can be shifted by shifting an optical element positioned between the surface of the SLM and an image projection surface. In other examples, light projection can be shifted by shifting an optical element between a light source and the surface of the SLM. The projected instances of the image are also referred to herein as the shifted images. The shifted images for an image to be projected can be obtained by processing the image according to a deconvolution filter and algorithm. The shift rate of the shifted images is sufficiently fast to perceive, by the human visual system (HVS), the shifted images over time as a single image. The shifted images are laterally shifted on the wall or screen to provide a combined image with a higher resolution than the resolution of the display. For example, an image can be shifted each time by a fraction of a pixel size and projected two or four times to provide the combined image with higher resolution. The image, which can be one of multiple images in a video frame, is projected and shifted multiple times at a rate within the video frame time period, such as at a rate faster than 1/50 seconds (s).

In SAF, increasing the number of shifted images, such as from two to four shifted images, can increase the resolution of the combined image to a limit, beyond which combining more shifted images can reduce the image quality. The decrease in image quality beyond this limit can be related to an increase in the amount of overlap among pixels of the shifted images. The overlap in the shifted images changes the variations between the shades of light across the combined image, which could cause blurring of at least some parts of the image to the human eye. For example, projecting eight shifted images may reduce the image quality in comparison to projecting four shifted images, such as due to the increase in the amount of overlap between pixels of the shifted images.

In the SLM display device, the pixels may be partially exposed to a light beam from one or more light sources. The partial light exposure of a pixel divides the total pixel area into an illuminated area, also referred to herein as an active area, and a remaining dark area between pixels. A portion of the light beam projected between the micromirrors that form the pixels is not reflected and appears in the projected image as a dark gap between pixels. The remaining dark area may not be exposed to light due to constraints in the display system, such as electrical, mechanical, or optical constraints. For example, increasing the angle of incidence of the light beam with respect to the surface of the pixels can cast shadows on some areas of the pixels. The ratio of the active area to the total area of the pixel is referred to herein as an OSFF of a pixel. The increase in resolution provided by SAF is related to the OSFF of the pixel. A decrease in the OSFF represents an increase in the dark area between pixels and a decrease in the active area of the pixel. Reducing OSFF, or increasing the dark area between pixels, allows for combining more shifted images in SAF without overlap among the shifted images, which increases image quality such as in terms of image sharpness.

This description includes various examples of an SLM display device configured to reduce OSFF to facilitate increasing the number of shifted images for SAF to increase display resolution. The OSFF is reduced by increasing the tilt of the illumination optics with respect to the surface of the pixels to increase the dark area between the pixels and accordingly extend the number of shifted images in SAF without overlap.

FIG. 1 is a block diagram of a display system 100, in accordance with various examples. The display system 100 may be a projection-based display system for projecting images or video. The display system 100 includes a projection-based display device 110 configured to project a modulated light beam 120 onto an image projection surface 130. Examples of the image projection surface 130 include a wall or a display screen. For example, the display screen may be a screen of an augmented reality (AR) or virtual reality (AR) display, a three-dimensional (3D) display, the ground or road for a headlight display, a projection surface in a vehicle such as for a windshield projection display, or other display surfaces for display devices. The modulated light beam 120 may be modulated by the display device 110 to project still images or moving images, such as video, onto the image projection surface 130. The modulated light beam 120 may be formed as a combination of light beams corresponding to multiple color modes provided by the display device 110. The display device 110 may include light sources (not shown) for providing the light beams at different wavelengths. The light beams at different wavelengths provide respective color components of the image and can be spatially modulated to form the image on the image projection surface 130. The display device 110 may include an SLM 200 having optical components (not shown) for modulating the light beams from the light sources to provide the images or video on the image projection surface 130. The display device 110 may also include a controller 212 coupled to the SLM 200 for controlling the components of the display device 110 to display the images or video. The modulated light beam 120 is shifted multiple times in the SLM 200 to project multiple shifted images for SAF on the image projection surface 130. The modulated light beam 120 can be shifted by shifting projection optics after illuminating the surface of the SLM 200. In other examples, the light beam can be shifted by shifting optics for illuminating the surface of the SLM 200. The display device 110 may further include one or more input/output devices (not shown), such as an audio input/output device, a key input device, a display, and the like.

Figure 2:
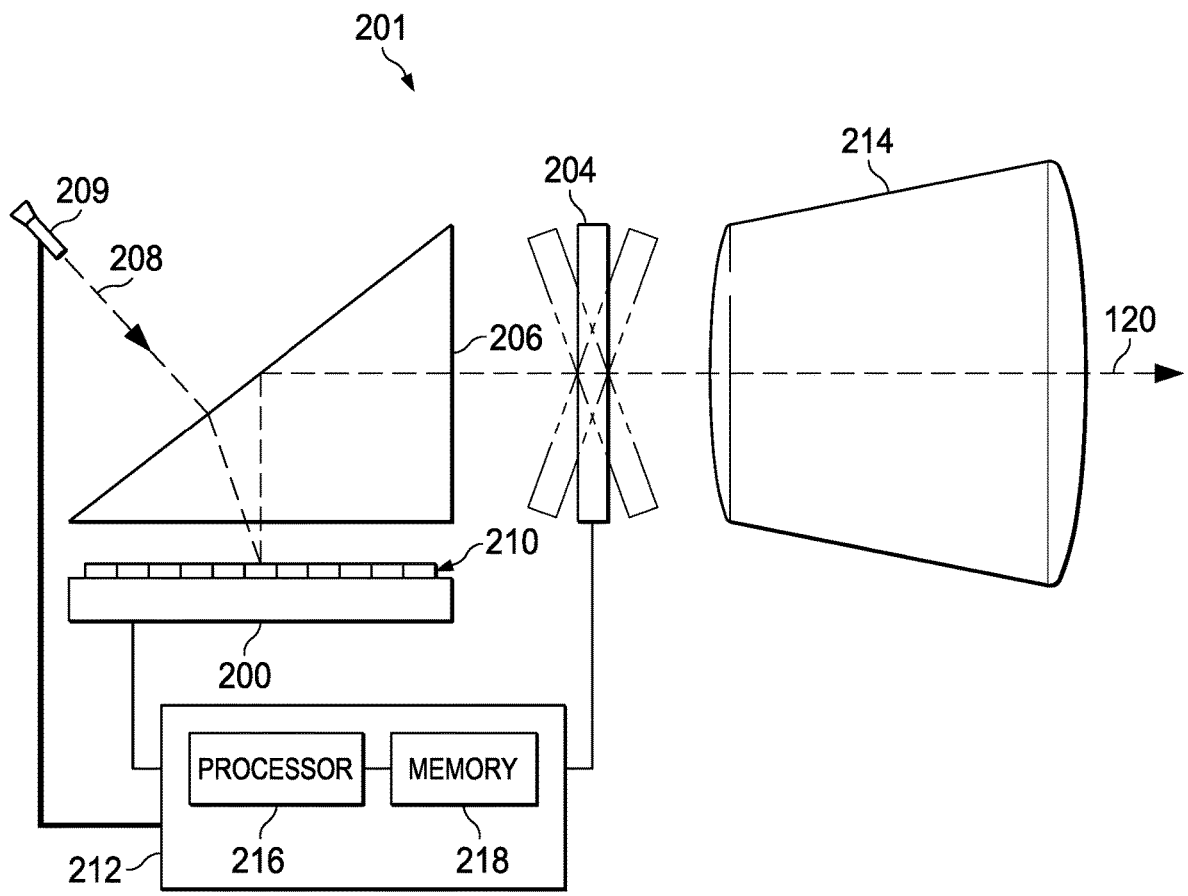
FIG. 2 is a diagram of an apparatus of a display device of the display system of FIG. 1, in accordance with various examples.

FIG. 2 is a block diagram of an apparatus 201 for an SLM display device for projecting shifted images for SAF, in accordance with various examples. The apparatus 201 is part of the display device 110 and projects the modulated light beam 120. The apparatus 201 includes the SLM 200, an actuator 204, and a prism 206 positioned between the SLM 200 and the actuator 204. The prism 206 directs an incident light beam 208 provided by one or more light sources 209 of the display device 110 onto micromirrors 210, which form a grid of pixels, of the SLM 200. The one or more light sources 209 are coupled to and controlled by the controller 212. The incident light beam 208 includes one or more light beams, such as at different wavelengths for different colors, from the one or more light sources 209. The micromirrors 210 may be micromirrors with adjustable tilt that are arranged in a grid that form the pixels on the surface of the SLM 200. To provide the modulated light beam 120, the micromirrors 210 modulate, according to the adjusted tilt, and reflect the incident light beam 208. The tilt of the micromirrors 201 is controlled by the controller 212. The modulated light beam 120 from the micromirrors 210 passes through the prism 206 which directs the modulated light beam 120 to the actuator 204. For example, the actuator 204 can be a transparent optical component, such as a slab of glass or glass like material, with adjustable tilt with respect to the prism 206. The modulated light beam 120 that enters the actuator 204 from a front side of the actuator 204 is refracted inside the actuator 204 by a refraction angle according to the tilt of the actuator 204. The refraction causes a spatial displacement in the modulated light beam 120 that exists from the back side of the actuator 204 with respect to the front side. The spatial displacement is based on the refraction angle and accordingly the tilt of the actuator 204. The spatial displacement provides a shift in the modulated light beam 120 caused by passing through the titled actuator 204. In other examples, the actuator 204 may include one or more adjustable optics, such as lenses, prisms, and/or electro-optical elements configured to shift the modulated light beam 120 or the incident light beam 208 by mechanical movement or applied voltage. The tilt of the actuator 204 is controlled by the controller 212 to shift the modulated light beam 120 laterally onto the image projection surface 130. The apparatus 201 also includes projection optics 214 for projecting and focusing the modulated light beam 120 onto the image projection surface 130. For example, the projection optics 214 can include one or more lenses configured to project the modulated light beam 120 onto the image projection surface 130. The controller 212 may include one or more processors 216 and one or more memories 218. The processor 216 may read and execute computer-readable instructions stored in the memory 218. The memory 218 can store software programs and/or multiple groups of instructions executable by the processor 216. The processor 216 also processes image data that may be stored in the memory 218 according to SAF to provide the shifted images for projection.

In SAF, an image at a certain resolution is shifted and projected multiple times on the image projection surface 130 to form the same image at a higher resolution. For example, an image can be shifted each time by a fraction of a pixel size and projected two or four times to provide the image with higher resolution. The image is shifted and projected at a rate which allows the human visual system to integrate the overlaid and shifted images into a single image. For example, the rate can be above a critical flicker fusion (CFF) threshold for the human eye. To project the shifted images, the images are first processed by translating encoded image data into linear values of light intensity. Spatial frequencies in the linear values of the shifted images may be filtered or attenuated by the HVS which acts as a low pass filter that naturally integrates the shifted images. The attenuation of the spatial frequencies can cause blurring in the combined image, which can increase as the number of shifted images increases.

To provide a higher resolution image by increasing the number of shifted images without increasing blurring, the encoded image data can be processed in the display system 100 with a deconvolution algorithm that mitigates blurring and compensates for the attenuation of the spatial frequencies by the HVS. The deconvolution algorithm, also referred to herein as a deconvolution function, include one or more steps to process an image with an electrooptical transfer function (EOTF), a polyphase filter, a deconvolution filter, and an anti-aliasing filter. Each shifted image is obtained by processing the image with the deconvolution function and adding a respective spatial shift according to a fraction of a pixel size.

The image is first processed by the EOTF to convert the image data to light intensity (e.g., brightness) values. For example, the image data can be a picture or video signal and the light intensity values can be linear values for modulating light by the SLM 200. The linear values can then be processed by the polyphase filter to up-sample the linear values. Up-sampling the linear values includes increasing the data samples and interpolating the linear values with the polyphase filter to provide higher sampling of the image data. The up-sampled linear values are then processed by the deconvolution filter that mitigates the attenuation of spatial frequencies by the HVS, and accordingly mitigates blurring in the projected image. The integration of the shifted images by the HVS represents a convolution process in reverse of the deconvolution function. Accordingly, the deconvolution filter performs as an inverse filter to process the linear values in each shifted image so that the combined image convolved by the HVS has a near flat frequency response. The deconvolution filter also mitigates unwanted noise in the projected image that can be caused by the optics, motion, or other noise contributors in the display system 100. After processing the shifted image with the deconvolution filter, the shifted images is down-sampled by the anti-aliasing filter. The down-sampling can remove some pixels from the image, such as removing even pixels from even lines and odd pixels from odd lines, to convert the image from an initial sampling grid to a down-sampled grid, such as from a square grid to a quincunx grid. In this case, diagonal high spatial frequency content in the image can be attenuated by a diamond passband filter. After the down-sampling, the linear values of the shifted image can be projected by modulating the incident light beam 208 according to the values. The deconvolution function is repeated to project each shifted image with a respective spatial shift.

Figure 3:
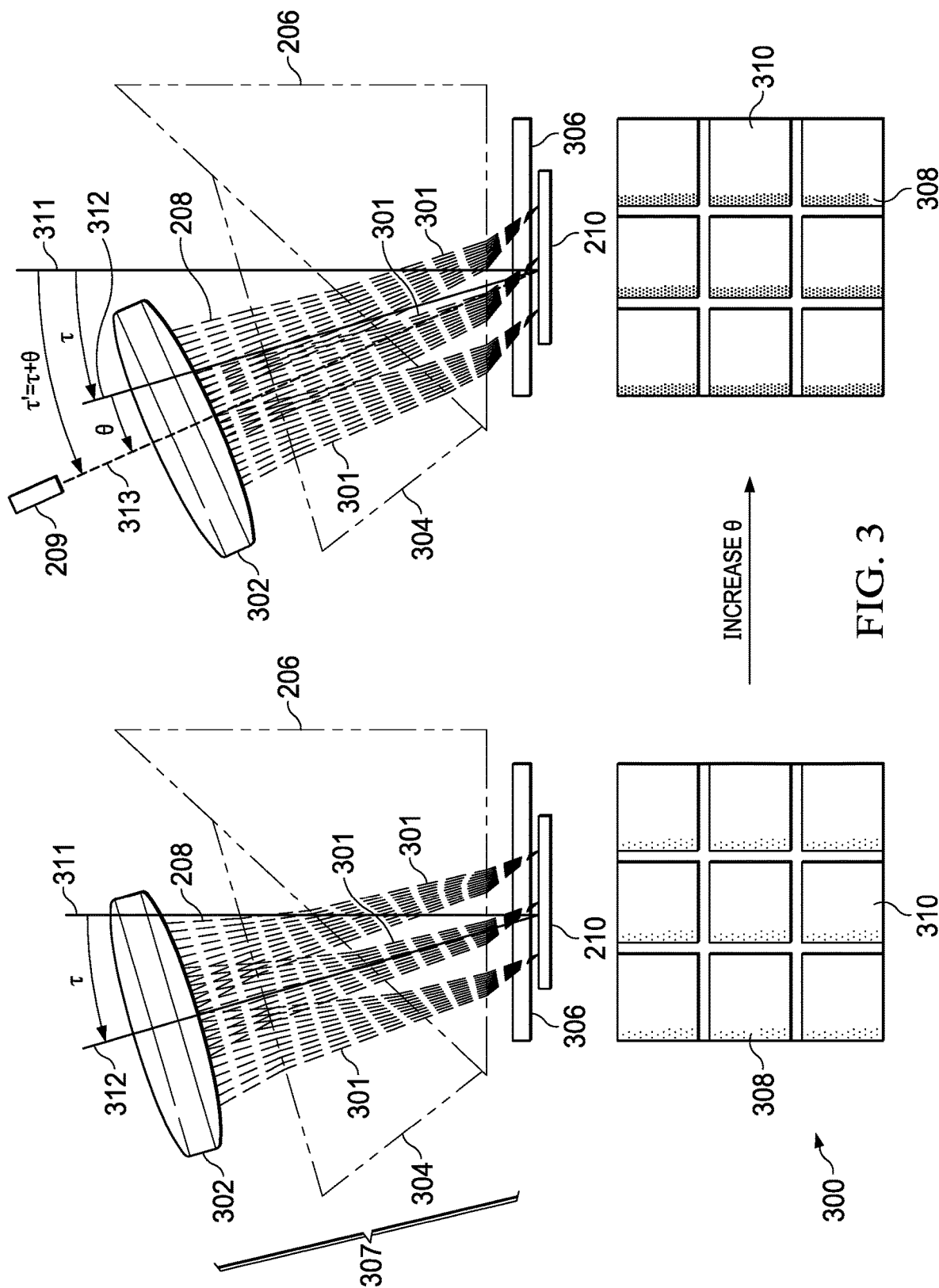
FIG. 3 is a diagram of an image of pixels provided by the apparatus of the display device of FIG. 2, in accordance with various examples.

FIG. 3 is a diagram of an image of pixels 300 provided by the SLM 200, in accordance with various examples. The image of pixels 300 is provided by projecting the incident light beam 208 through the prism 206 onto the micromirrors 210. FIG. 3 shows the trajectory of some incident lights rays 301 of the incident light beam 208 projected through additional optics of the apparatus 201 to shape the incident light beam 208, such as a focusing lens 302, a second prism 304, a protecting transparent cover 306, such as a glass cover, for the micromirrors 210. For example, the incident light beam 208 can be formed by light illumination from three light sources 209. A group of incident lights rays 301 that form light from each of the three light sources 209 is shown in FIG. 3. The light from the light sources 209 can be projected simultaneously or sequentially in time to form the incident light beam 208. The focusing lens 302, the second prism 304, and the prism 206 are part of illumination optics 307 for projecting the incident light beam 208 on the micromirrors 210. In other examples, the apparatus 201 may not include the prism 206 or the second prism 304 and the incident light beam 208 is projected from the focusing lens 302 onto the micromirrors 210. The illumination optics 307 may include other optics (not shown), such as one or more additional lenses, between the light sources 209 and the micromirrors 210. The incident light beam 208 is incident onto the pixels of the SLM 200 at a certain angle with respect to the surface of the micromirrors 210, which are adjusted and controlled to project the image of pixels 300 on the image projection surface 130.

If the micromirrors210 are not tilted, the incident angle threshold to reflect the incident light beam 208 from the illumination optics 307 into the modulated light beam 120 in the projection optics 214 can be 0°. If the micromirrors210 are tilted by a certain tilt angle to modulate the incident light beam 208, the incident angle threshold to reflect the incident light beam 208 is to twice (2×) this tilt angle of the micromirrors210. Accordingly, in FIG. 3, the incident angle threshold ($\tau$) of the illumination optics 307 is equal to 2× the tilt angle of the micromirrors210, also referred to herein as the TRP tilt angle. The incident angle threshold ($\tau$) also causes the edges of the tilted micromirrors210 to cast shadows onto adjacent tilted micromirrors210. Accordingly, the image of pixels 300 includes dark areas 308 between active areas 310 where light is being projected.

Increasing the dark areas 308 can be useful to increase the resolution of the SLM 200 without reducing image quality, such as image sharpness. The resolution of the SLM 200 can be increased by increasing the number of shifted images for SAF, without reducing the pixel size or increasing the area of the grid of pixels. The number of shifted images for SAF can be increased without reducing image quality by reducing overlap between the shifted images. For example, overlap between shifted images of the image of pixels 300 can be reduced by increasing the dark areas 308 in the image of pixels 300.

To increase the dark areas 308, an incident angle ($\tau'$) of the incident light beam 208 can be greater than the TRP tilt angle. In this case, the TRP tilt angle causes partial reflection of the incident light beam 208 toward the modulated light beam 120. To provide this relation between and the TRP tilt angle, the tilt of the focusing lens 302 with respect to the surface of micromirrors 210 is increased by an offset angle $\theta$ with respect to the incident angle threshold ($\tau$). As shown in FIG. 3, $\tau$ extends from a vertical line 311 with respect to the surface of the micromirrors 210 to a first tilted line 312 with respect to the vertical line 311. The offset angle $\theta$ extends from the first tilted line 312 to a second tilted line 313 away from the vertical line 311. The incident angle ($\tau'$) extends from the vertical line 311 to the second tilted line 313. Increasing the tilt of the focusing lens 302 by the offset angle $\theta$ with respect to $\tau$ casts more shadows onto the micromirrors 210 and accordingly increases the dark areas 308 in the image of pixels 300. As shown in FIG. 3, the dark areas 308 increase in a direction aligned with the direction of the offset angle $\theta$. As the dark areas 308 in the image of pixels 300 increase, more shifted images for SAF can be projected on the image projection surface 130 with less overlap.

Figure 4:
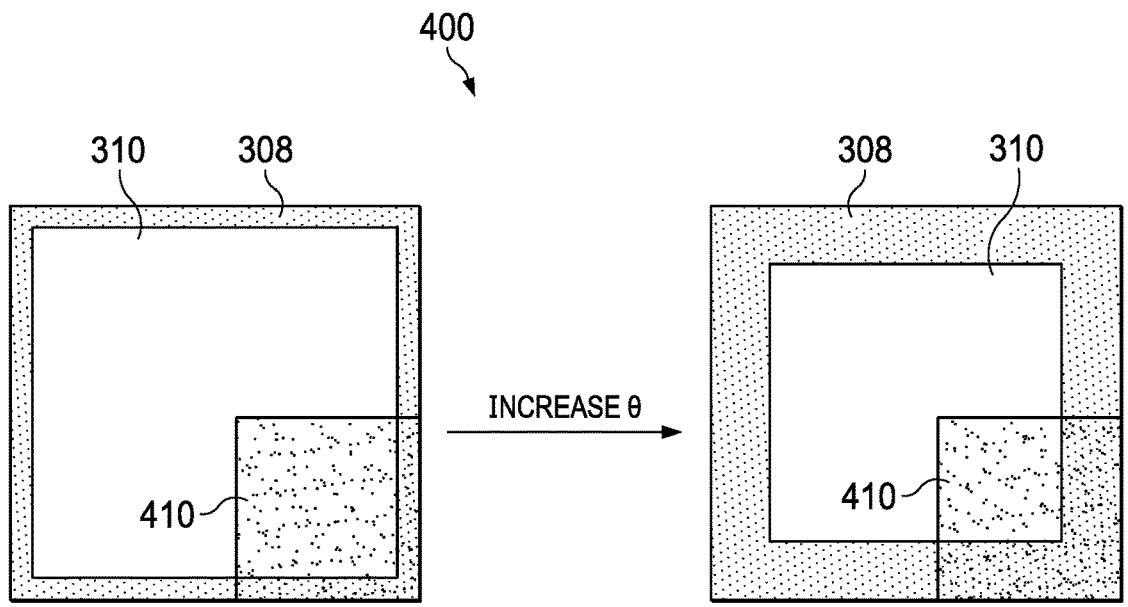
FIG. 4 is a diagram of OSFF in the image of pixels of FIG. 3, in accordance with various examples.

FIG. 4 is a diagram of an OSFF 400 for a pixel in the image of pixels of FIG. 3, in accordance with various examples. The OSFF 400 includes the active area 310 and the dark area 308 for a pixel of pixels 300. FIG. 4 also shows an overlap 410 between a same pixel of two or more shifted images for SAF. The overlap 410 is caused by shifting the same pixel of two or more shifted images on the image projection surface 130. As shown in FIG. 4, the size of the dark area 308 within the overlap 410 is increased with the increase in the offset angle $\theta$. The increase in the dark area 308 within the overlap 410 reduces variations in the shades of light per pixel and across the image which reduces blurring in the image. Accordingly, resolution can be increased by adding the number of shifted images for SAF without reducing sharpness in the image.

Figure 5:
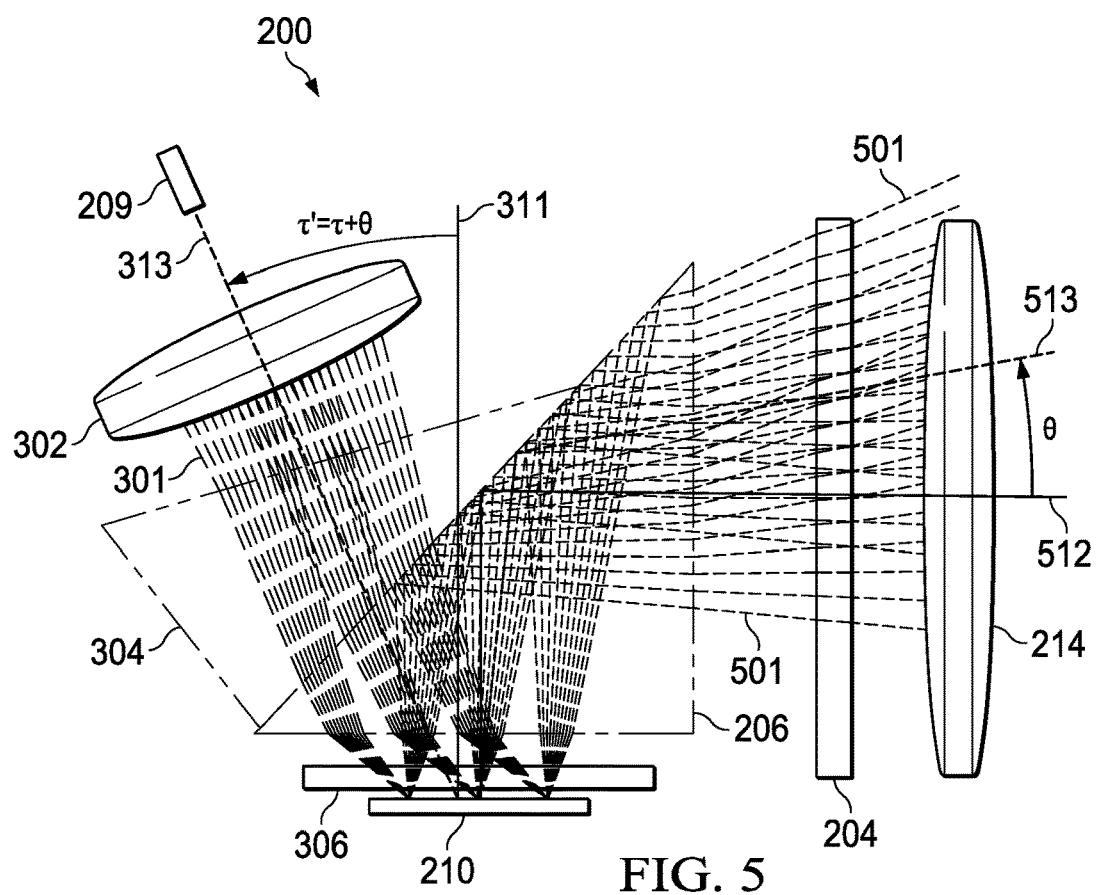
FIG. 5 is a diagram of in the apparatus of the display device of FIG. 2, in accordance with various examples.

FIG. 5 is a diagram of optics in the apparatus 201 for illuminating the SLM 200 and collecting the light modulated and reflected by the SLM 200, in accordance with various examples. The projection optics 214 collects modulated light rays 501 that form the modulated light beam 120, which is projected onto the image projection surface 130. The modulated light rays 501 are provided by reflecting the incident light rays 301 by the micromirrors 210. The modulated light rays 501 are directed by the prism 206 to the actuator 204 and the projection optics 214. In other examples, the apparatus 201 may include a telecentric lens or may be configured in a field lens type architecture without the prism 206 to direct the incident light rays 301 and the modulated light rays 501 and separate the modulated light rays 501 from the incident lights rays 301. As shown in FIG. 5, if the incident angle of the incident light beam 208 and accordingly the incident light rays 301 is increased by an offset angle $\theta$ with respect to the incident angle threshold ($\tau$), the reflected angle of the modulated light rays 501 is offset by the same offset angle $\theta$. The offset angle $\theta$ extends from the horizontal line 512 to a tilted line 513 with respect to the horizontal line 512, which is an extension of the optical axis of the second tilted line 313 through the optics of the apparatus 201. Accordingly, some of the modulated light rays 501 can be projected outside the projection optics 214 and may not be captured by the projection optics 214. In this case, some of the modulated light beam 120, which is formed by the modulated light rays 501, is not projected onto the image projection surface 130, which causes vignetting of the projected image on the image projection surface 130. Vignetting represents a reduction of brightness in the image toward the periphery compared to the center of the image.

Vignetting can be mitigated by increasing the collection of the modulated light rays 501 and accordingly the modulated light beam 120. The collection of the modulated light rays 501 is increased if the aperture size of the projection optics 214 is larger than the aperture size of the illumination optics 307. Increasing the size of the projection optics 214 can also increase cost. Increasing the f-number of the illumination optics 307, which is inversely proportional to the aperture size, to reduce the spread of the modulated light rays 501 and allow more light collection by the projection optics 214 can reduce the Etendue in the apparatus 201. Increasing the f-number of the illumination optics 307 may also reduce the diffraction efficiency of the micromirrors 210 and accordingly the sharpness of the projected image on the image projection surface 130. The diffraction efficiency of the micromirrors 210 is reduced due to reflecting some of the energy of the incident light rays 301 outside the modulated light rays 501. In examples, to increase the collection of the modulated light rays 501 and avoid both increasing the cost of the projection optics 214 and reducing the Etendue and the diffraction efficiency of the SLM 200, the modulated light beam 120 is projected by one or more laser light sources which have a reduced illumination beam width in comparison to other light sources, such as light emitting diodes (LEDs). The illumination beam width of a light source is also referred to herein as an illumination pupil. The aperture size of the projection optics 214 is also larger than the aperture size of the illumination optics 307 to increase the collection of the modulated light rays 501. Accordingly, the f-number of the illumination optics 307 is higher than the f-number of the projection optics 214.

Figure 6:
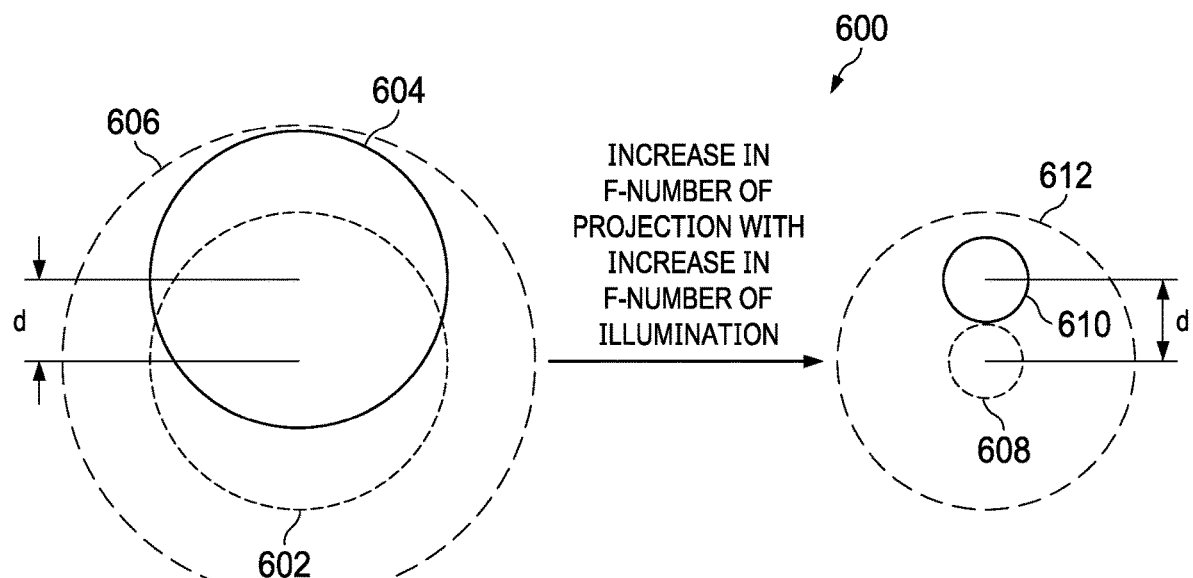
FIG. 6 is a diagram of light projection and collection by the apparatus of the display device of FIG. 2, in accordance with various examples.

FIG. 6 is a diagram of light projection and collection 600 in the apparatus 201, in accordance with various examples. FIG. 6 shows projection, illumination, and collection pupils for two alternative sets of optics in the apparatus 201 with different f-numbers. In a first set with larger size optics and lower f-numbers for projecting and collecting light, a first projection pupil 602 is provided by the illumination optics 307 from a light source, such as an LED, onto the micromirrors 210. The micromirrors 210 reflect the first projection pupil 602 to provide a first illumination pupil 604 on the projection optics 214. If the incident angle of the incident light beam 208 is offset by the offset angle $\theta$ to increase the dark areas 308, the first illumination pupil 604 is displaced by a distance d off the optical axis on the image projection surface 130, which is proportional to an angular displacement equal to the offset projection angle $\theta$. Accordingly, the first illumination pupil 604 is off-axis with respect to the first projection pupil 602. A first aperture size 606 of the projection optics 214 is chosen to be large enough to collect the first illumination pupil 604. In a second set of smaller size optics with higher f-numbers in comparison to the first set, a second projection pupil 608 is provided by the illumination optics 307 configured for a laser source onto the micromirrors 210, which reflect a respective second illumination pupil 610 on the projection optics 214. Because a laser source can provide a reduced illumination pupil in comparison to other light sources, such as LEDs, the second projection pupil 608 and second illumination pupil 610 can be smaller than the first projection pupil 602 and first illumination pupil 604. Accordingly, in this second set, a second aperture size 612 of the projection optics 214 can be smaller than the first aperture size 606.

For example, in the first set of optics, the f-number of the illumination optics 307 is approximately 1.7, the incident angle of the incident light beam 208 is approximately 45 degrees) (°), the TRP tilt angle is approximately 17°, the offset angle θ is approximately 9°, and the f-number of the projection optics 214 is approximately 1.14. The offset angle θ is calculated as the difference between the incident angle of the incident light beam 208 and 2× the TRP tilt angle. The f-number of the projection optics 214 is calculated according to the sum of the offset angle θ at approximately 9° and a projection angle of approximately 17° which is associated with the f-number of the illumination optics 307. In this case, the sum of the offset angle θ and the projection angle of the illumination optics 307 is approximately 26°.

In the second set of optics, the f-number of the illumination optics 307 for a laser source is approximately 3.6 and, similar to the first set, the incident angle of the incident light beam 208 is at approximately 45°, the TRP tilt angle is at approximately 17°, and the offset angle θ is at approximately 9°. The f-number of the projection optics 214 in the second set is approximately 1.7. The sum of the offset angle θ and the projection angle associated with the f-number of the illumination optics 307 is approximately 17°. In comparison to the first set of optics, the f-number of the projection optics 214 in the second set can be increased to 1.7 if a laser source provides the incident light and the f-number of the illumination optics 307 is increased. In the second set, the sum of the offset angle θ and the projection angle of the illumination optics 307 is reduced to approximately 17°.

Figure 7:
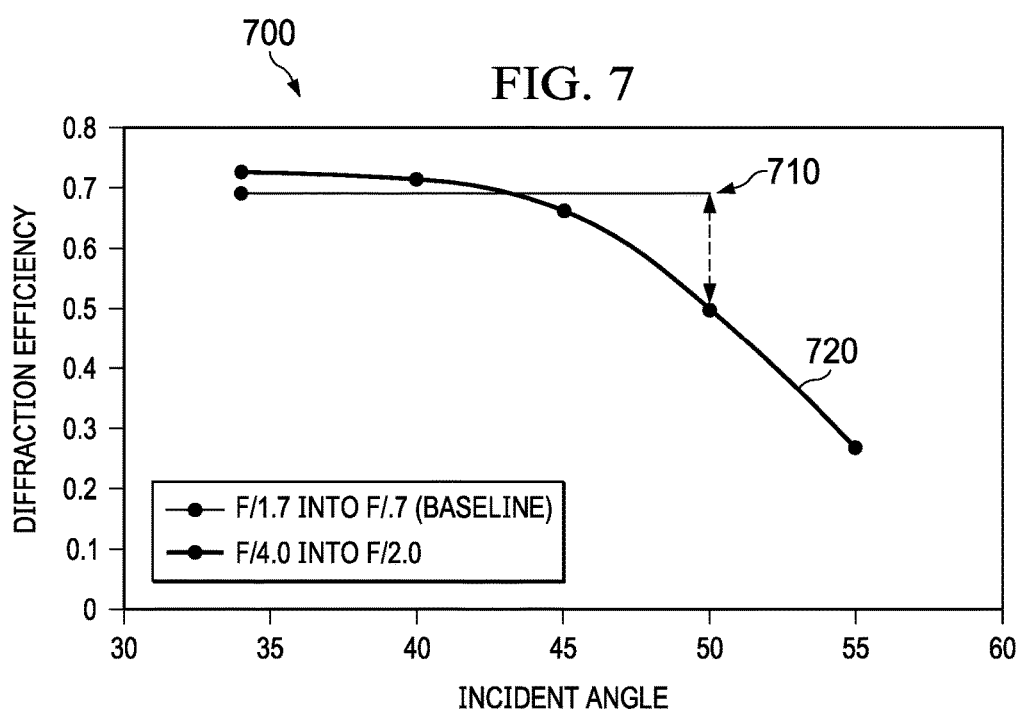
FIG. 7 is a graph showing diffraction efficiency provided by the display device of FIG. 2, in accordance with various examples.

FIG. 7 is a graph showing diffraction efficiency 700 provided by the SLM 200 of the display device 110, in accordance with various examples. The x-axis represents a range of incident angles (in degrees) of the incident light beam 208 onto the micromirrors 210. The y-axis represents the diffraction efficiency of the SLM 200. The diffraction efficiency of the SLM 200 represents the amount of optical energy that can be transferred from the incident light beam 208 to the modulated light beam 120. The diffraction efficiency of the SLM 200 can be a combination of (e.g., represented mathematically as the product of) the OSFF of the pixels, the diffraction efficiency of the micromirrors 210, the reflection efficiency of the micromirrors 210, and the transmission factor of the combined optics in the apparatus 201. The diffraction efficiency and reflection efficiency of the micromirrors 210 represent the amount of optical energy in the incident light rays 301 that is reflected by the micromirrors 210 into the modulated light rays 501.

In FIG. 7, the values of the diffraction efficiency on the y-axis are scaled from 0 to 1, where 0 represents no optical energy transferred from the incident light beam 208 into the modulated light beam 120, and 1 represents 100 percent (%) of the optical energy transferred into the modulated light beam 120. In the example shown in FIG. 7, the TRP tilt angle is equal to approximately 17°. In this case, the incident angle threshold to reflect the light beam 208 into the modulated light beam 120 is equal to approximately 34°, which is 2× the TRP tilt angle. In other examples, the TRP tilt angle can be less than 17° and accordingly the incident angle threshold can be less than 34°.

The benchmark line 710 represents a benchmark diffraction efficiency at approximately 0.7 which can be provided by light projection and collection optics with a f-number of approximately 1.7. The curve 720 represents the variation of the diffraction efficiency at different incident angles of the incident light beam 208 with a f-number of approximately 4.0 for the illumination optics 307 and a f-number of approximately 2.0 for the projection optics 214. The curve 720 shows higher diffraction efficiency than the benchmark diffraction efficiency for the incident angles of 35° and 40°. The diffraction efficiency represented by the curve 720 drops below the benchmark diffraction efficiency at the incident angle of 45° and further drops rapidly to approximately 25% below the benchmark line 710 at the incident angle of 50°.

For example, an incident angle of 45°, which is equal to the sum of an offset angle θ of 9° and the 2× the TRP tilt angle of 34°, can increase the OSFF of the pixels in comparison to an incident angle of 40°. The incident angle of 45° can also provide a diffraction efficiency close to the maximum achievable diffraction efficiency of the SLM 200. If the incident angle is further increased to approximately 50°, the diffraction efficiency can drop below a certain threshold (e.g., 25%). Accordingly, the micromirrors 210 may be illuminated by the incent angle of 45° to provide close to highest diffraction efficiency with increased OSFF. The incident angle of the incident light beam 208 may be kept under a certain angle, such as 45°, to avoid a decrease in the diffraction efficiency of the SLM 200. In other examples, the TRP tilt angle, the f-numbers of the light projection and collection optics, and the benchmark line 710 and the curve 720 can be different than shown in FIG. 7. Accordingly, the incident angle that provides a highest diffraction efficiency with increased OSFF can vary.

Figure 8:
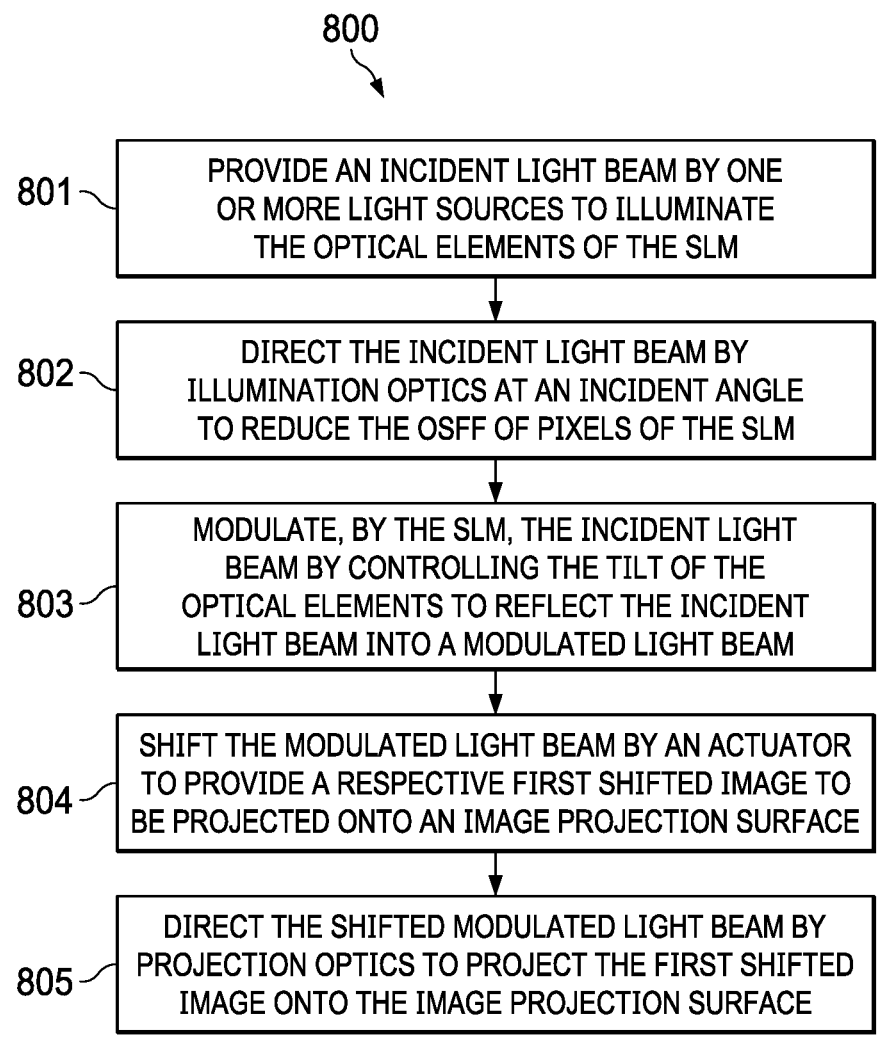
FIG. 8 is a flow diagram of a method for projecting and collecting shifted images for shift-add fusion (SAF) in the apparatus of the display device of FIG. 2, in accordance with various examples.

FIG. 8 is a flow diagram of a method 800 for projecting and collecting shifted images for SAF in the apparatus 201 of the display device 110, in accordance with various examples. The number of shifted images can be six or eight shifted images to increase the resolution of the combined image without reducing the image quality due to overlap between the shifted images. At step 801, an incident light beam is provided by one or more light sources to illuminate the micromirrors of the SLM. The one or more light sources can be laser light sources that provide the incident light beam at respective color modes. The one or more light sources can be configured to provide respective light beams that are combined simultaneously or in sequence in time to form the incident light beam.

At step 802, the incident light beam is directed by illumination optics at an incident angle with respect to the surface of the SLM to reduce the OSFF of pixels of the SLM. Reducing the OSFF increases dark areas in an image of pixels and accordingly reduces overlap among the shifted images for SAF. At this incident angle, the diffraction efficiency of the SLM can also be maintained above a certain threshold. The incident angle can be based on the f-numbers of the projection and collection optics, such as for the illumination optics 307 and the projection optics 214 in the apparatus 201. For example, the one or more light source 209 illuminate, with the illumination optics 307, the micromirrors 210 at an incident angle of approximately 45°. If the TRP tilt angle is approximately 17°, the incident light beam 208 at the incident angle of 45° is at an offset of approximately 9° from 2× the TRP tilt angle. In this case, the f-number of the illumination optics can be approximately 3.6, and the f-number of the projection optics can be approximately 1.7.

At step 803, the SLM modulates the incident light beam by controlling the tilt of the micromirrors to reflect the incident light beam into a modulated light beam. At step 804, the modulated light beam is shifted by an actuator to provide a respective first shifted image to be projected onto an image projection surface. At step 805, the shifted modulated light beam is directed by projection optics to project the first shifted image onto the image projection surface. In examples, the steps 804 and 805 may be reversed in order according to the positioning of the actuator and the projection optics in the apparatus 201. The steps 804 and 805 can also be combined into a single step, such as if the actuator is part of the projection optics.

The steps 801-805 can be repeated to obtain multiple shifted images for SAF. In each iteration of the steps 801-805, the image is shifted and projected to a respective shifted position on the image projection surface. The shifted images are projected to form a combined image with higher resolution according to SAF. For example, the steps 801-805 can be repeated six or eight times to provide six or eight shifted images, respectively.

The shifted images can be processed for projection in sequence, where each shifted image is obtained by processing a to-be-projected image with a convolution function and a respective spatial shift that is at a fraction of a pixel size. Processing the image with the convolution function includes processing the image data with a deconvolution filter that compensates for the attenuation of spatial frequencies in the projected image by the HVS. The shifted image can also be processed with an EOTF and a polyphase filter prior to the deconvolution filter and with an anti-aliasing filter after the deconvolution filter. The anti-aliasing filter down-samples the shifted image with respect to the to-be-projected image. The deconvolution function with the deconvolution filter and respective spatial shifts is repeated until reaching a total number of respective shifted images for SAF. The shifted images are projected in sequence in time by repositioning an actuator at respective positions with a certain rate, such as above the CFF threshold.

Figure 9:
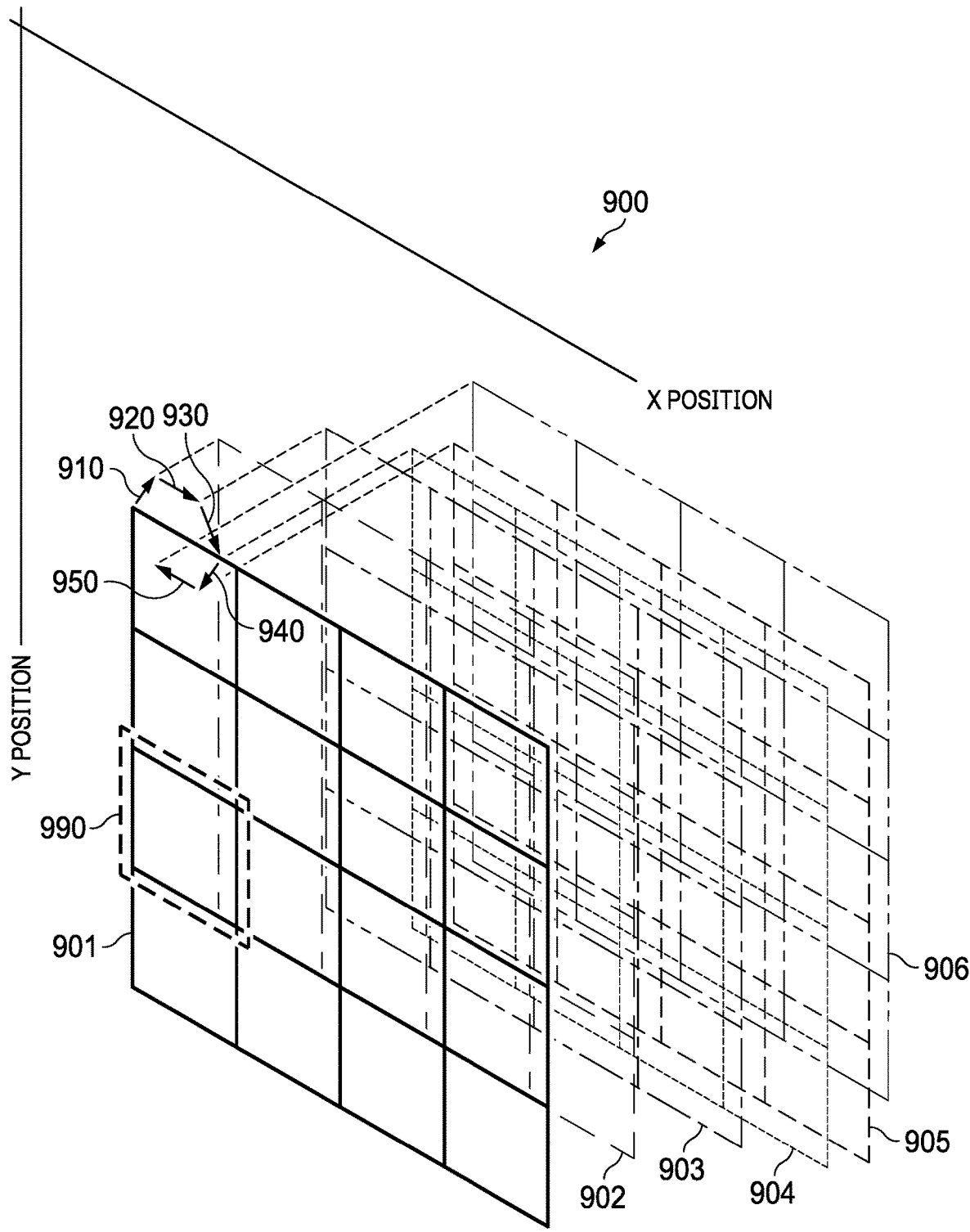
FIG. 9 is a diagram of six shifted images projected onto a display surface to provide a higher resolution image according to SAF, in accordance with various examples.

FIG. 9 is a diagram of six shifted images 900 that are projected onto a display surface to provide a higher resolution combined image according to SAF, in accordance with various examples. The six shifted images 900 can be shifted and projected according to the steps of the method 800 by the apparatus 201 onto the image projection surface 130. The shifted images 900 include a first shifted image 901, a second shifted image 902, a third shifted image 903, a fourth shifted image 904, a fifth shifted image 905, and a sixth shifted image 906. The shifted images 900 include the same number of pixels 990 in the image. Each pixel 990 is represented by a square slot in the shifted images 900. The shifted images 900 are instances of the same image that are shifted to respective locations with respective offsets in x and y positions across the image projection surface 130.

For example, the offsets can be according to translations in a rectangular grid or a quincunx grid. As shown in FIG. 9, the first shifted image 901 can be translated on the grid in a first direction 910 to provide the second shifted image 902. Similarly, the third shifted image 903, fourth shifted image 904, fifth shifted image 905, and sixth shifted image 906 can be provided by a sequence of translations in a second direction 920, third direction 930, fourth direction 940, and fifth direction 950, respectively. Each translation is a fraction of a pixel width. In other examples, the shifted images 900 can be translated in other directions. The shifted images 900 are projected at the x and y positions of the shifted images 900 by controlling the actuator 204. For example, the actuator 204 is tilted at respective angles to provide the respective offsets in the x and y positions of the shifted images 900.

Figure 10:
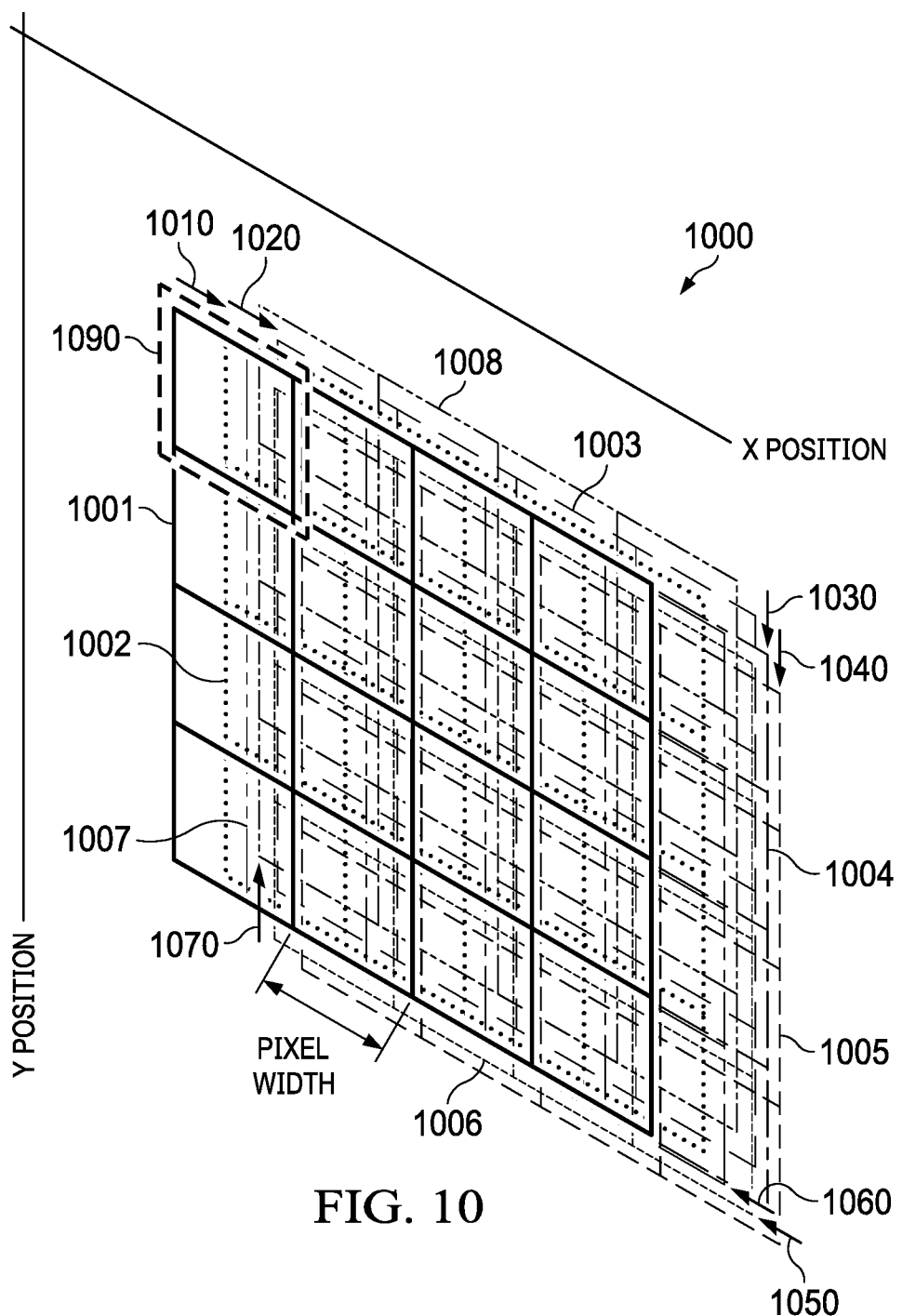
FIG. 10 is a diagram of eight shifted images projected onto a display surface to provide a higher resolution image according to SAF, in accordance with various examples.

FIG. 10 is a diagram of eight shifted images 1000 that are projected onto a display surface to provide a higher resolution combined image according to SAF, in accordance with various examples. The eight shifted images 1000 may be shifted by repeating eight times the steps 804 and 805 of the method 800. The shifted images 1000 include a first shifted image 1001, a second shifted image 1002, a third shifted image 1003, a fourth shifted image 1004, a fifth shifted image 1005, a sixth shifted image 1006, a seventh shifted image 1008, and an eighth shifted image 1008. The shifted images 1000 include the same number of pixels 1090 in the image. The shifted images 1000 are shifted to respective locations with respective offsets in x and y positions across the image projection surface 130.

For example, the offsets can be according to translations in a rectangular grid. As shown in FIG. 10, the first shifted image 1001 can be translated on the grid in a first direction 1010 to provide the second shifted image 1002. Similarly, the third shifted image 1003, fourth shifted image 1004, fifth shifted image 1005, sixth shifted image 1006, seventh shifted image 1007, and eighth shifted image 1008 can be provided by a sequence of translations in a second direction 1020, third direction 1030, fourth direction 1040, fifth direction 1050, sixth direction 1060, and seventh direction 1070, respectively. Each translation is a fraction of a pixel width. In other examples, the shifted images 1000 can be translated in other directions and/or in a quincunx grid.

In FIGS. 9 and 10, the x and y positions of the shifted images 900 and shifted images 1000 can provide overlap in the pixels 990 and 1090 of the shifted images 900 and 1000, respectively. The overlap may increase as the number of shifted images for SAF increases and can reduce image quality, such as increase blurring in the projected image. For example, the overlap in the pixels 1090 of the shifted images 1000 can be greater than the overlap in the pixels 990 of the shifted images 900, which can reduce image quality such as by increasing blurring. To reduce the effect of increasing the number of shifted images for SAF on increasing the overlap and accordingly reducing image quality, the overlap between the shifted images can be mitigated by reducing the OSFF in the pixels of the projected image. The OSFF can be reduced by increasing the incident angle of the light beam that illuminates the micromirrors of the SLM to project the shifted images. For example, according to step 802 of the method 800, the incident light beam can be directed by illumination optics at an incident angle that increases the dark areas in the image of pixels and accordingly reduces overlap among the shifted images for SAF.

The term "couple" appears throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A system or device that is described herein as including certain components may instead be adapted to be coupled to those components to form the described system or device.

While certain components may be described herein as being of a particular process technology, these components may be exchanged for components of other process technologies. Systems and devices described herein are reconfigurable to include the replaced components to provide functionality at least partially similar to functionality available prior to the component replacement.

Unless otherwise stated, "about," "approximately," or "substantially" preceding a value means+/−10 percent of the stated value. Modifications are possible in the described examples, and other examples are possible within the scope of the claims.

What is claimed is:

1. An apparatus, comprising:
   illumination optics comprising a focusing lens, the illumination optics having an f-number;
   a spatial light modulator (SLM) optically coupled to the focusing lens and to the illumination optics, the SLM comprising pixels on a surface of the SLM, wherein the focusing lens is tilted at an incident angle relative to the surface of the SLM;
   an actuator optically coupled to the SLM; and
   projection optics optically coupled to the actuator, the projection optics having an f-number, the f-number of the illumination optics greater than the f-number of the projection optics.

2. The apparatus of claim 1, further comprising a laser optically coupled to the focusing lens.

3. The apparatus of claim 1, wherein the incident angle is at least 40 degrees (°).

4. The apparatus of claim 3, wherein the incident angle is between 45 degrees (°) and 50°.

5. The apparatus of claim 1, wherein the f-number of the focusing lens is greater than 3.5, and wherein the f-number of the projection optics is greater than 1.5.

6. The apparatus of claim 1, wherein the focusing lens is tilted with respect to the surface of the SLM to reduce an on-screen fill factor for a pixel in an image of pixels.

7. The apparatus of claim 1, wherein the actuator and the projection optics are configured to project shifted images for shift-add fusion (SAF) onto a display surface, and wherein the focusing lens is tilted with respect to the surface of the SLM to decrease overlap between respective shifted pixels of the shifted images.

8. The apparatus of claim 7, wherein the shifted images for SAF comprise six or eight shifted images of a same image for SAF.

9. A display device comprising:
   a light source configured to produce incident light;
   a spatial light modulator (SLM) having a surface, the SLM comprising pixels on the surface;
   illumination optics comprising a focusing lens, the illumination optics having an f-number, the focusing lens optically coupled to the light source and to the SLM, the focusing lens configured to direct the incident light towards the SLM;
   the pixels configured to reflect the incident light to produce modulated light;
   an actuator optically coupled to the SLM, the actuator configured to shift the modulated light from the SLM according to a tilt position of the actuator to produce shifted light; and
   a projection lens optically coupled to the actuator, the projection lens having an f-number, the projection lens configured to project the shifted light, the f-number of the illumination optics greater than the f-number of the projection lens.

10. The display device of claim 9, wherein the focusing lens and the projection lens are configured to provide the modulated light with a diffraction efficiency that is higher than 70 percent with respect to the incident light.

11. The display device of claim 9, wherein the pixels are micromirrors.

12. The display device of claim 11, further comprising a controller coupled to the SLM and to the actuator, the controller configured to control a tilt position of the actuator and tilt angles of the micromirrors.

13. The display device of claim 11, wherein the micromirrors are tilted at an angle to reflect the incident light, and wherein tilting the micromirrors casts shadows in dark areas on the micromirrors.

14. A method comprising:
   providing incident light by one or more light sources;
   directing the incident light by illumination optics towards micromirrors of a spatial light modulator (SLM);
   modulating the incident light by the SLM by tilting the micromirrors to reflect the incident light into modulated light, wherein tilting the micromirrors casts shadows in dark areas on the micromirrors;
   shifting the modulated light by an actuator to provide shifted modulated light; and
   directing the shifted modulated light by projection optics to project a shifted image.

15. The method of claim 14, wherein the incident light is first incident light, the modulated light is first modulated light, the shifted modulated light is first shifted modulated light, and the shifted image is a first shifted image, the method further comprising:
   providing second incident light by the one or more light sources;
   directing the second incident light by the illumination optics towards the micromirrors of the SLM;
   modulating the second incident light by the SLM to produce second modulated light;
   shifting the second modulated light by the actuator to provide second shifted modulated light; and
   directing the shifted modulated light by the projection optics to project a second shifted image, wherein the second shifted image is shifted relative to the first shifted image.

16. The method of claim 15, further comprising:
   obtaining the first shifted image by processing a higher resolution image according to a deconvolution function with a deconvolution filter and a first spatial shift; and
   obtaining the second shifted image by processing the higher resolution image according to the deconvolution function with the deconvolution filter and a second spatial shift.

17. The method of claim 16, further comprising:
   repeating obtaining shifted images by processing the higher resolution image according to the deconvolution function with the deconvolution filter and respective spatial shifts, until reaching a total number of the shifted images for SAF; and projecting the shifted images by repositioning the actuator at respective positions.

18. The method of claim 17, wherein the first spatial shift, second spatial shift, and respective spatial shifts are at a fraction of a pixel size of the SLM.

* * * * *